US012802162B2

(12) United States Patent
Jiao et al.

(10) Patent No.: US 12,802,162 B2
(45) Date of Patent: Nov. 17, 2026

(54) PADDING METHOD, APPARATUS, SYSTEM AND COMPUTER READABLE STORAGE MEDIUM

(71) Applicant: Shenzhen Corerain Technologies Co., Ltd., Shenzhen (CN)

(72) Inventors: Li Jiao, Shenzhen (CN); Kuenhung Tsoi, Shenzhen (CN); Xinyu Niu, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 1043 days.

(21) Appl. No.: 18/054,532

(22) Filed: Nov. 10, 2022

(65) Prior Publication Data

US 2023/0177640 A1 Jun. 8, 2023

(30) Foreign Application Priority Data

Dec. 7, 2021 (CN) ......................... 202111488846.0

(51) Int. Cl.
*G06T 3/4046* (2024.01)
*G06T 3/403* (2024.01)

(52) U.S. Cl.
CPC ............ *G06T 3/4046* (2013.01); *G06T 3/403* (2013.01)

(58) Field of Classification Search
CPC .......... G06T 3/4046; G06T 3/403; G06T 1/60
See application file for complete search history.

(56) References Cited

U.S. PATENT DOCUMENTS 10,909,728 B1 * 2/2021 Appalaraju ............ G06N 20/10
10,990,650 B1 4/2021 Vantrease et al.
11,429,851 B1 * 8/2022 Zhang .................... G06F 9/3001
11,681,902 B2 * 6/2023 Huynh .................. G06F 17/153
706/41
2011/0074802 A1 * 3/2011 Nickolls ................... G06T 1/60
345/564
2016/0261880 A1 * 9/2016 Lee ........................ H04N 19/44
(Continued)

FOREIGN PATENT DOCUMENTS

CN 107368295 A 11/2017
CN 109299437 A 2/2019
(Continued)

OTHER PUBLICATIONS

Bradski, Kaehler, OpenCV, "Adding borders to your images", OpenCV (Nov. 16, 2020, accessed via The Wayback Machine). https://web.archive.org/web/20201116212530/https://vovkos.github.io/doxyrest-showcase/opencv/sphinxdoc/page_tutorial_copyMakeBorder.html. (Year: 2020).*
(Continued)

*Primary Examiner* — Chan S Park
*Assistant Examiner* — Noah William Boyar

(57) ABSTRACT

A padding method, apparatus, system and computer readable storage medium for an AI chip is disclosed. The method includes: when a calculation command is detected, obtaining a first coordinate set contained in a calculation window and a storage address set corresponding to an original picture, and according to the first coordinate set and the storage address set, determining whether the calculation window contains a padding data position; if the calculation window contains the padding data position, performing a padding operation on the padding data position according to a preset padding mode.

13 Claims, 2 Drawing Sheets

(56) References Cited

U.S. PATENT DOCUMENTS

| | | | | |
|---|---|---|---|---|
| 2019/0164037 | A1 | 5/2019 | Kim et al. | |
| 2020/0349433 | A1* | 11/2020 | Xiao | G06F 17/15 |
| 2021/0127135 | A1* | 4/2021 | Lee | G06N 3/04 |
| 2021/0326406 | A1* | 10/2021 | Wang | G06N 3/0464 |
| 2024/0069915 | A1* | 2/2024 | Taassori | G06F 12/10 |

FOREIGN PATENT DOCUMENTS

| | | | | |
|---|---|---|---|---|
| CN | 111435544 | A | 7/2020 | |
| CN | 111489295 | A | 8/2020 | |
| CN | 112995549 | A | 6/2021 | |
| EP | 3460725 | A1 | 3/2019 | |
| KR | 20120043209 | A * | 5/2012 | G06T 1/20 |
| WO | 2021061566 | A1 | 4/2021 | |

OTHER PUBLICATIONS

OpenCV, "Image Filtering" (Dec 16, 2016, evidenced by "last updated" footer from link below). https://web.archive.org/web/20221005002137/https://docs.huihoo.com/opencv/2.4-documentation/modules/imgproc/doc/filtering.html#int%20borderInterpolate(int%20p,%20int%20len,%20int%20borderType) (Year: 2016).*

Bai, Lin, Yecheng Lyu, and Xinming Huang. "A unified hardware architecture for convolutions and deconvolutions in CNN." 2020 IEEE International Symposium on Circuits and Systems (ISCAS). IEEE, 2020. (Year: 2020).*

* cited by examiner

PADDING METHOD, APPARATUS, SYSTEM AND COMPUTER READABLE STORAGE MEDIUM

CROSS REFERENCE TO RELATED APPLICATIONS

The present application claims the benefit of Chinese Patent Application No. 202111488846.0 filed on Dec. 7, 2021, the contents of which are incorporated herein by reference in their entirety.

TECHNICAL FIELD

The present disclosure relates to the technical field of neural networks, and in particular, to a padding method, apparatus, system and computer readable storage medium.

BACKGROUND

The padding operation is a common operation in the neural network algorithm. It is usually used to preprocess the input data to be processed, and specific constants are padded surrounding the input data to be processed, such that a preset shape of the input data to be processed is obtained after the operation of subsequent algorithms. The traditional method uses software to perform the padding operation. That is, the processor is used to execute the corresponding padding program according to the preset padding mode, and the padding data is read in the external memory to complete the padding operation, which seriously reduces the operation performance of the AI chip and reduces the computational efficiency of neural network algorithms.

Therefore, how to improve the efficiency of the padding operation to improve the performance of the AI chip, thereby improving the computational efficiency of the neural network algorithm, is an urgent problem to be solved.

SUMMARY

The main purpose of the present disclosure is to propose a padding method, apparatus, system and computer readable storage medium, which aims to solve the problem of how to improve the efficiency of padding operation to improve the performance of AI chips, thereby improving the computational efficiency of neural network algorithms.

In order to achieve the above purpose, the present disclosure provides a padding method, the padding method including the following steps:

- when a calculation command is detected, obtaining a first coordinate set contained in a calculation window and a storage address set corresponding to an original picture, and according to the first coordinate set and the storage address set, determining whether the calculation window contains a padding data position;
- if the calculation window contains the padding data position, performing a padding operation on the padding data position according to a preset padding mode.

Preferably, before the step of when a calculation command is detected, obtaining a first coordinate set contained in a calculation window and a storage address set corresponding to an original picture, and according to the first coordinate set and the storage address set, determining whether the calculation window contains a padding data position, the padding method includes:

- obtaining the original picture, according to the number of rows and columns of the original picture, generating a second coordinate set corresponding to a valid data position in the original picture, so as to obtain the storage address set corresponding to the original picture, and according to the storage address set, storing a valid data in the original picture into a memory.

Preferably, the step of according to the first coordinate set and the storage address set, determining whether the calculation window contains a padding data position includes:

- determining a boundary coordinate set of the original picture in the second coordinate set corresponding to the storage address set, and performing a boundary detection based on the first coordinate set and the boundary coordinate set;
- if there is a first coordinate outside the boundary coordinate set in the first coordinate set, determining that the calculation window contains the padding data position.

Preferably, the step of if the calculation window contains the padding data position, performing a padding operation on the padding data position according to a preset padding mode includes:

- if the calculation window contains the padding data position, obtaining and identifying the preset padding mode;
- if the preset padding mode is a first padding mode, determining a padding rule according to the first padding mode, and performing the padding operation on the padding data position according to the padding rule;
- if the preset padding mode is a second padding mode, reading a corresponding first data, and padding the first data to the padding data position.

Preferably, the step of if the preset padding mode is a first padding mode, determining a padding rule according to the first padding mode, and performing the padding operation on the padding data position according to the padding rule include:

- if the preset padding mode is the first padding mode, correcting a first storage address corresponding to the first coordinate of the padding data position, and reading a corresponding second data according to a corrected storage address;
- padding the second data as a padding data to the padding data position.

Preferably, the step of correcting a first storage address corresponding to the first coordinate of the padding data position includes:

- according to the first padding mode and the storage address set corresponding to the original picture, determining a second storage address corresponding to a data to be padded in the padding data position, and correcting the first storage address corresponding to the first coordinate of the padding data position to the second storage address.

Preferably, after the step of if the calculation window contains the padding data position, performing a padding operation on the padding data position according to a preset padding mode, the padding method further includes:

- inputting a data set contained in the calculation window that has undergone the padding operation into a calculation module to obtain a target calculation result, and performing the steps of obtaining the first coordinate set contained in the calculation window and the storage address set corresponding the original picture, and according to the first coordinate set and the storage address set, determining whether the calculation window contains the padding data position.

In addition, in order to achieve the above purpose, the present disclosure also provides a padding apparatus, the padding apparatus including:

an obtaining module, configured to when a calculation command is detected, obtain a first coordinate set contained in a calculation window and a storage address set corresponding to an original picture, and according to the first coordinate set and the storage address set, determine whether the calculation window contains a padding data position;

a padding module, configured to if the calculation window contains the padding data position, perform a padding operation on the padding data position according to a preset padding mode.

Furthermore, the obtaining module further include a storing module, the storing module configured to obtain the original picture, generate a second coordinate set corresponding to a valid data position in the original picture according to the number of rows and columns of the original picture, so as to obtain the storage address set corresponding to the original picture, and according to the storage address set, store a valid data in the original picture into a memory.

Furthermore, the obtaining module is further configured to determine a boundary coordinate set of the original picture in the second coordinate set corresponding to the storage address set, and perform a boundary detection based on the first coordinate set and the boundary coordinate set;

if there is a first coordinate outside the boundary coordinate set in the first coordinate set, determine that the calculation window contains the padding data position.

Furthermore, the padding module is further configured to if the calculation window contains the padding data position, obtain and identify the preset padding mode;

if the preset padding mode is a first padding mode, determine a padding rule according to the first padding mode, and perform the padding operation on the padding data position according to the padding rule;

if the preset padding mode is a second padding mode, read a corresponding first data, and pad the first data to the padding data position.

Furthermore, the padding module is further configured to if the preset padding mode is the first padding mode, correct a first storage address corresponding to the first coordinate of the padding data position, and read a corresponding second data according to a corrected storage address;

pad the second data as a padding data to the padding data position.

Furthermore, the padding module further includes a correction module, the correction module configured to according to the first padding mode and the storage address set corresponding to the original picture, determine a second storage address corresponding to a data to be padded in the padding data position, and correct the first storage address corresponding to the first coordinate of the padding data position to the second storage address.

Furthermore, the padding module further include an outputting module, the outputting module configured to input the address corrected by the correction module into the storing module, obtain the data contained in the calculation window of a neural network algorithm, and output the data to a calculation module of an AI chip, and complete a calculation process of the neural network algorithm to obtain the target calculation result.

In addition, in order to achieve the above purpose, the present disclosure also provides a padding system of an AI chip, the padding system including: a memory, a processor, an AI chip, and a padding driver program stored in the memory and runnable on the processor to drive the AI chip to execute. When driving the AI chip to execute, the padding driver program implements the steps of the padding method described above.

In addition, in order to achieve the above purpose, the present disclosure also provides a computer readable storage medium, on which a padding driver program is stored, and when driving the AI chip to execute, the padding driver program implements the steps of the padding method described above.

The padding method proposed by the present disclosure, when a calculation command is detected, obtains a first coordinate set contained in a calculation window and a storage address set corresponding to an original picture, and according to the first coordinate set and the storage address set, determines whether the calculation window contains a padding data position; if the calculation window contains the padding data position, performs a padding operation on the padding data position according to a preset padding mode. The present disclosure determines whether the calculation window contains the padding data position according to the coordinate set and the storage address set, if the calculation window contains the padding data position, performs a padding operation on the padding data position according to a preset padding mode, so as to improve the efficiency of the padding operation to improve the performance of the AI chip, thereby improving the computational efficiency of the neural network algorithm.

The realization, functional characteristics and advantages of the present disclosure will be further described with reference to the accompanying drawings combined with the embodiments.

DETAILED DESCRIPTION

It should be understood that the specific embodiments described herein are only used to explain the present disclosure, but not to limit the present disclosure.

Figure 1:
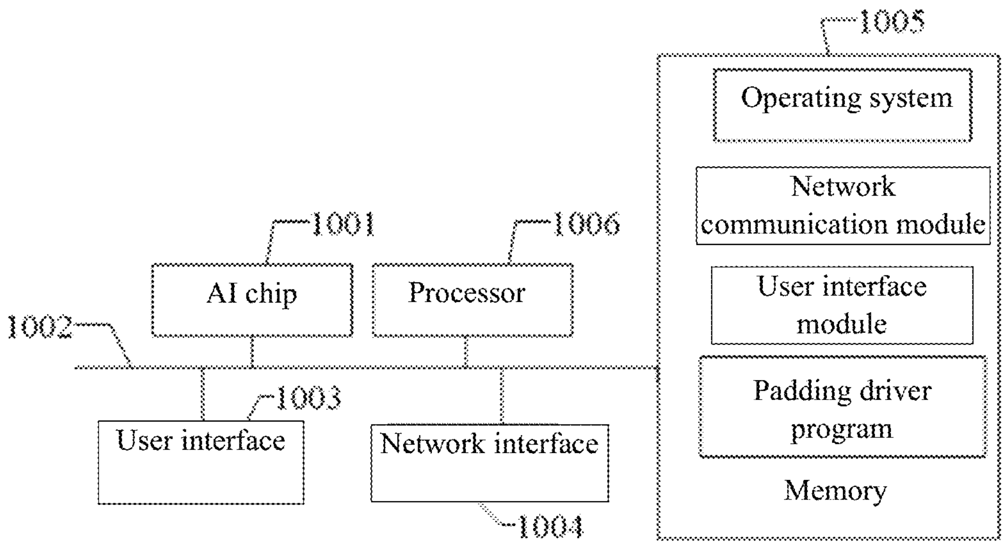
FIG. 1 is a schematic diagram of a system structure of a hardware operating environment involved in an embodiment of the present disclosure.

As shown in FIG. 1, FIG. 1 is a schematic diagram of a system structure of a hardware operating environment involved in an embodiment of the present disclosure.

The system in the embodiment of the present disclosure may be a PC or a server system.

As shown in FIG. 1, the system may include: an AI chip 1001, a network interface 1004, a user interface 1003, a memory 1005, a processor 1006, and a communication bus 1002. Among them, the communication bus 1002 is used to realize the connection and communication between these components. The user interface 1003 may include a display screen (Display), an input unit such as a keyboard. Optionally, the user interface 1003 may also include a standard wired interface and/or a wireless interface. Optionally, the network interface 1004 may include a standard wired interface and/or a wireless interface (e.g., a WI-FI interface). The memory 1005 may be a high-speed RAM memory, or may be a non-volatile memory, such as a disk memory. Optionally, the memory 1005 may also be a storage apparatus independent of the aforementioned AI chip 1001 and the aforementioned processor 1006.

Those skilled in the art can understand that the system structure shown in FIG. 1 does not constitute a limitation to the system, and may include more or less components than the one shown, a combination of some components, or different arrangement of the components.

As shown in FIG. 1, the memory 1005, as a computer storage medium, may include an operating system, a network communication module, a user interface module and a padding driver program.

Among them, the operating system is a program that manages and controls processor apparatuses, AI chip apparatuses and software resources, and supports the operation of the network communication module, the user interface module, the padding driver program, and other programs or software. The network communication module is used to manage and control the network interface 1002. The user interface module is used to manage and control the user interface 1003.

In the padding apparatus system shown in FIG. 1, the padding apparatus of the AI chip 1001 is driven by the processor 1006 to call the padding driver program stored in the memory 1005, and executes the operations in various embodiments of the padding method below.

Based on the above hardware structure, an embodiment of the padding method of the present disclosure is proposed.

Figure 2:
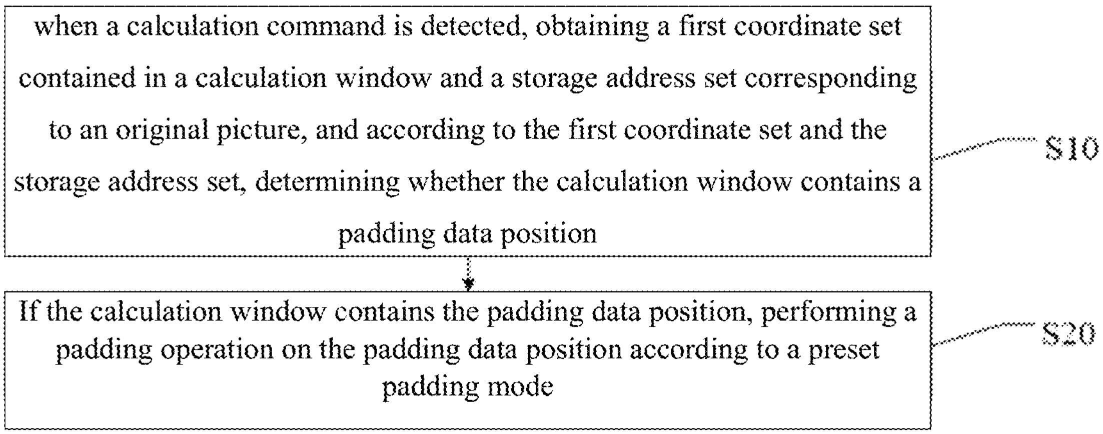
FIG. 2 is the schematic flow chart of the first embodiment of the padding method of the present disclosure.

Referring to FIG. 2, FIG. 2 is a schematic flowchart of the first embodiment of the padding method of the present disclosure, and the method includes:

Step S10, when a calculation command is detected, obtaining a first coordinate set contained in a calculation window and a storage address set corresponding to an original picture, and according to the first coordinate set and the storage address set, determining whether the calculation window contains a padding data position;

Step S20, if the calculation window contains the padding data position, performing a padding operation on the padding data position according to a preset padding mode.

Figure 4:
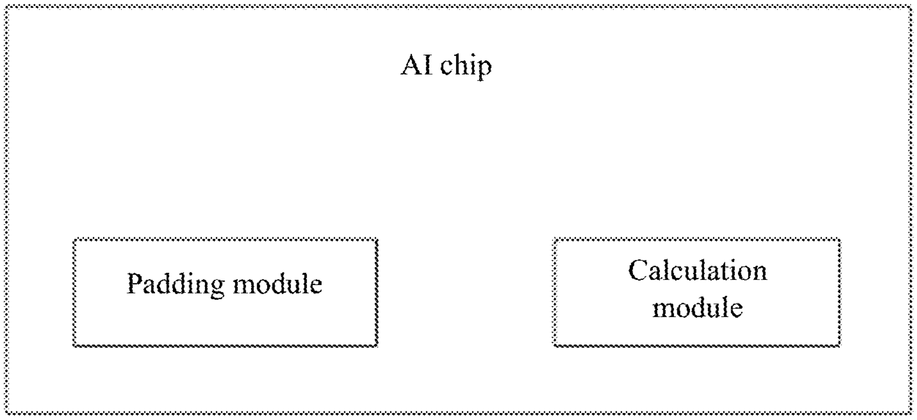
FIG. 4 is a schematic diagram of the structural relationship between the AI chip, the padding module and the calculation module of the present disclosure.

The padding method in this embodiment is applied to a padding apparatus of an image processing system. The padding apparatus may be an AI chip terminal or a PC apparatus. For the convenience of description, an AI chip padding apparatus is used as an example to describe the padding apparatus. The AI chip padding apparatus includes, but is not limited to, an AI chip, a row/column address generator, a comparison unit (width/height border detector), an address correction unit (row/column address fix), an address transformation unit (address transform) and a selection output unit (MUX). When the AI chip in the AI chip padding apparatus detects the calculation command, it obtains the first coordinate set contained in the calculation window and the storage address set corresponding to the original image, determines the boundary coordinate set of the original image in the second coordinate set corresponding to the storage address set, and performs boundary detection based on the first coordinate set and the boundary coordinate set by the comparison unit. If there is a first coordinate outside the boundary coordinate set in the first coordinate set, it is determined that the calculation window contains the padding data position. If the padding apparatus in the AI chip padding apparatus determines that the calculation window contains the padding data position, it obtains and identifies the preset padding mode; if the preset padding mode is the first padding mode, corrects the first storage address corresponding to the first coordinate of the padding data position by the address correction unit and the address transformation unit, reads the corresponding second data from the memory according to the corrected first storage address, and pads the second data as the padding data to the padding data position by the selection output unit; if the preset padding mode is the second padding mode, reads the corresponding first data, and pads the first data to the padding data position by the selection output unit. It can be understood that, as shown in FIG. 4, the AI chip padding apparatus includes, but is not limited to, a padding module and a calculation module in the padding apparatus.

It should be noted that the calculation window may be the calculation window corresponding to the convolution operation or the calculation window corresponding to the pooling operation, and the specific operation can be determined according to the actual situation. The preset padding mode includes the first padding mode and the second padding mode which is set and implemented in advance in the AI chip padding apparatus. The AI chip padding apparatus may determine the corresponding preset padding mode according to the specific neural network algorithm. The first padding mode includes: a replication padding mode (replication), a reflection padding mode (reflection and reflection 101) and a wrap padding mode (wrap). The second padding mode is a constant padding mode (constant). The AI chip padding apparatus may generate a virtual target image according to the original image. For the constant padding mode, the AI chip padding apparatus determines the padding position in the original image according to the constant that needs to be padded specified in the specific neural network algorithm, pads the corresponding constant to the padding data position in the virtual target picture, and then obtains the corresponding target picture. For other padding modes, the AI chip padding apparatus determines the padding position in the original image according to the padding rules specified in the specific neural network algorithm, pads the corresponding data to the padding data position in the virtual target picture, and then obtains the corresponding target picture, which is the image that has been padded from the original picture.

The padding method of this embodiment, when a calculation command is detected, obtains a first coordinate set contained in a calculation window and a storage address set corresponding to an original picture, and according to the first coordinate set and the storage address set, determines whether the calculation window contains a padding data position; if the calculation window contains the padding data position, performs a padding operation on the padding data position according to a preset padding mode. The present disclosure determines whether the calculation window contains the padding data position according to the coordinate set and the storage address set, if the calculation window contains the padding data position, performs a padding operation on the padding data position according to a preset padding mode, so as to improve the efficiency of the padding operation to improve the performance of the AI chip, thereby improving the computational efficiency of the neural network algorithm.

Figure 3:
FIG. 3 is a schematic diagram of a virtual target picture of the present disclosure.

The individual steps are explained in detail below:

Step S10, when a calculation command is detected, obtaining a first coordinate set contained in a calculation window and a storage address set corresponding to an original picture, and according to the first coordinate set and the storage address set, determining whether the calculation window contains a padding data position;

In this embodiment, when the AI chip padding apparatus detects a calculation command, it generates a padding position on the periphery of the original image according to the original image and a specific neural network algorithm, and obtains a virtual target image. There is no data in the padding position of the virtual target image. the AI chip of the padding system performs a frame selection on the virtual target image by controlling the calculation window, and obtains the first coordinate set contained in the frame selection part of the calculation window and the corresponding storage address set of each data position of the original image in the memory, and according to the first coordinate set and the storage address set, determines whether the calculation window contains the padding data position. For example, with reference to FIG. 3, FIG. 3 is a schematic diagram of a virtual target picture, a position where a circle of "P" on the periphery of the virtual target picture is located is the padding position. "P" represents the data to be padded in the padding data position of the virtual target picture. For the constant padding mode, the padding data position in the virtual target picture needs to be padded with the corresponding constant, that is, "P" may be "0", "1", etc. For other padding modes, it is necessary to confirm the data that needs to be padded in the padding data position through the subsequent steps. The padding apparatus of the AI chip controls the calculation window of which a height and a width are 3 to move on the target picture. When the calculation window moves to the upper left corner of the target picture as shown in FIG. 3, i.e., the position of the black box shown in FIG. 3, the first coordinate corresponding to each data position contained in the frame selection part of the calculated window is obtained to obtain the first coordinate set, the corresponding storage address set of each data position of the original image in the memory is obtained, and according to the first coordinate set and the storage address set, it is determined that the calculation window contains the padded data position. When the calculation window moves to other positions of the target image, the above method is also used to determine whether the calculation window contains the padding data position, which will not be repeated here.

Specifically, before step S10, it includes:

Step a, obtaining the original picture, according to the number of rows and columns of the original picture, generating a second coordinate set corresponding to a valid data position in the original picture, so as to obtain the storage address set corresponding to the original picture, and according to the storage address set, storing a valid data in the original picture into a memory.

In this step, the AI chip obtains the original picture, generates the coordinates of each valid data position in the original picture according to the number of rows and columns of the original picture, so as to obtain the storage addresses set corresponding to the original picture, and according to the storage address set, stores the valid data contained in the picture into the memory. For example, referring to FIG. 3, the number part in FIG. 3 is the original picture, the "P" part represents the padding position, and the number of rows and columns of the original picture is 8. The padding apparatus takes the upper left corner of the original image as the origin, the number of columns as the abscissa, and the number of rows as the ordinate, and then determines the coordinates of each data position in the original image. For example, the coordinates of the first row and first column are (1,1), and the coordinates of the second row and the fourth column are (4, 2). According to the coordinates of each data position, the storage address corresponding to each data position is generated. If the coordinates of the first row and the first column are (1, 1), and the corresponding storage address is 1a+1; the coordinates of the second row and the fourth column are (4, 2), and the corresponding storage address is 2a+4, and then the storage address set corresponding to the original picture is obtained. According to the storage address set, the data contained in the original picture is stored in the memory, wherein the padding apparatus only stores the valid data in the original picture into the memory, which is not only conducive to saving the storage space of the memory, but also conducive to improving the performance of the AI chip of the padding apparatus.

Specifically, the step of according to the first coordinate set and the storage address set, determining whether the calculation window contains a padding data position includes:

Step c, determining a boundary coordinate set of the original picture in the second coordinate set corresponding to the storage address set, and performing a boundary detection based on the first coordinate set and the boundary coordinate set;

In this step, after obtaining the first coordinate set corresponding to the data position in the virtual target picture selected by the calculation window, the padding apparatus determines the boundary coordinate set belonging to the original picture in the second coordinate set corresponding to the storage address set, and performs boundary detection based on the first coordinate set and the boundary coordinate set. For example, the padding apparatus first generates the row address and column address in the virtual target picture through the row and column address generator, then generates the first coordinate corresponding to each position in the virtual target picture, determines the boundary coordinate set in the original picture according to the second coordinate set corresponding to the storage address set of the original picture, and compares the first coordinate set and the boundary coordinate set to perform boundary detection to determine whether there is a first coordinate outside the boundary of the original picture in the first coordinate set.

Step d, if there is a first coordinate outside the boundary coordinate set in the first coordinate set, determining that the calculation window contains the padding data position.

In this step, the padding apparatus compares the first coordinate set with the boundary coordinate set to perform the boundary detection; if the detection result is that there is a first coordinate outside the boundary coordinate set in the first coordinate set, determines that the calculation window contains the padding data position. For example, when the calculation window is located in the upper left corner of the virtual target picture as shown in FIG. 3, that is, the position of the black box, the first coordinate set selected by the calculation window at this time includes: (1,1), (2,1), (3,1), (1,2), (2,2), (3,2), (1,3), (2,3) and (3,3). The padding apparatus will compare (1,1), (2,1), (3,1), (1,2), (2,2), (3,2), (1,3), (2,3) and (3,3) in the first coordinate set with the boundary coordinates set corresponding to the original image respectively, and the comparison results are obtained: (1,1), (2,1), (3,1), (1,2) and (1,3) belong to the first coordinates outside the boundary coordinate set, that is, the coordinates corresponding to the padded data position in the virtual target image; (2,2), (3,2), (2,3) and (3,3) belong to the coordinates corresponding to the valid data position in the original picture; (2,2), (3,2) and (2,3) belong to the boundary coordinates of the original picture. The padding apparatus determines that the calculation window contains padding data positions, and determines the coordinates corresponding to each padding data position. It should be noted that, when the calculation window is located at another position of the target image, the steps of determining whether the calculation window contains the padding data position is similar to the above steps, and will not be repeated here.

Step S20, if the calculation window contains the padding data position, performing a padding operation on the padding data position according to a preset padding mode.

In this embodiment, if the padding apparatus determines that the calculation window contains the padding data position, it determines a preset padding mode according to a specific neural network algorithm; if the preset padding mode is the first padding mode, that is, the replication padding mode (replication), reflection padding mode (reflection and reflection 101) or wrap padding mode (wrap), determines the padding rule according to the first padding mode, and performs the padding operation on the padding data position according to the padding rule. If the preset padding mode is the second padding mode, that is, the constant padding mode (constant), the corresponding first data is read, and the first data is padded to the padding data position. It should be noted that the padding rule is determined according to a specific preset padding mode, and different preset padding modes correspond to different padding rules.

Further, if the padding apparatus determines that the calculation window does not contain the padding data position, that is, the calculation window only contains the valid data position in the original picture, then the padding apparatus directly reads the corresponding valid data in the memory according to the corresponding storage address of the valid data in the memory, and performs corresponding calculations based on the valid data.

Specifically, step S20 includes:

Step e, if the calculation window contains the padding data position, obtaining and identifying the preset padding mode;

In this step, if the padding apparatus determines that the calculation window contains the padding data, it obtains and identifies whether the preset padding mode is the first padding mode or the second padding mode.

Step f, if the preset padding mode is a first padding mode, determining a padding rule according to the first padding mode, and performing the padding operation on the padding data position according to the padding rule;

In this step, if the padding apparatus determines that the preset padding mode is the first padding mode, that is, replication padding mode (replication), reflection padding mode (reflection and reflection 101), or the wrap padding mode (wrap), it determines the corresponding padding rule according to the corresponding padding mode, and performs a padding operation on the padding data position in the calculation window according to the padding rule.

Specifically, step f includes:

Step f1, if the preset padding mode is the first padding mode, correcting a first storage address corresponding to the first coordinate of the padding data position, and reading a corresponding second data according to a corrected first storage address;

In this step, if the padding apparatus determines that the preset padding mode is the first padding mode, it determines a corresponding padding rule according to the corresponding padding mode, corrects a first storage address corresponding to the first coordinate of the padding data position in the calculation window, according to the padding rule, and reads a corresponding second data according to a corrected first storage address. It should be noted that the second data is the corresponding data that needs to be padded to the padding data position.

Further, the step of correcting the storage address corresponding to the padding data position includes:

according to the first padding mode and the storage address set corresponding to the original picture, determining a second storage address corresponding to a data to be padded in the padding data position, and correcting the first storage address corresponding to the first coordinate of the padding data position to the second storage address.

In this step, the padding apparatus determines the second storage address corresponding to the data to be padded in the padding data position according to the first padding mode and the storage address set corresponding to the original picture, and corrects the first storage address corresponding to the first coordinate of the padding data position to the second storage address. For example, when the first padding mode is replication padding mode (replication), according to the padding rule corresponding to the replication padding mode (replication), the boundary value of the original picture needs to be replicated and padded to the corresponding padding data position. Assuming that the calculation window is located in the upper left corner of the target image as shown in FIG. 3, that is, the position of the black box, the valid data 0 with the coordinate (2,2) needs to be replicated and padded to the padding data position corresponding to the coordinate (1,1), the valid data 0 with the coordinate (2,2) needs to be replicated and padded to the padding data position corresponding to the coordinate (2,1), the valid data 1 with the coordinate (3,2) needs to be replicated and padded to the padding data position corresponding to the coordinate (3,1), the valid data 0 with the coordinate (2,2) needs to be replicated and padded to the padding data position corresponding to the coordinate (1,2), and the valid data 8 with the coordinate (2,3) needs to be replicated and padded to the padding data position corresponding to the coordinate (1,3). The padding apparatus determines that the second storage addresses corresponding to the valid data 0, 1, and 8 in the original picture are 2a+2, 2a+3 and 3a+2. Through the address correction unit and the address transformation unit, the first storage addresses 1a+1, 1a+2 and 2a+1 corresponding to the padding data positions corresponding to the coordinates (1,1), (2,1) and (1,2) are all corrected to the second storage address 2a+2 corresponding to the valid data 0, the first storage address 1a+3 corresponding to the padding data position corresponding to the coordinate (3,1) is corrected to the second storage address 2a+3 corresponding to the valid data 1, and the first storage address 3a+1 corresponding to the padding data position corresponding to the coordinate (1,3) is corrected to the second storage address 3a+2 corresponding to the valid data 8. It should be noted that when the first padding mode is the reflection padding mode (reflection and reflection 101) or the wrap padding mode (wrap), correspondingly, according to the different padding modes, it is determined that the specific data to be padded in the padding data position is which of the non-padded data in the original picture, and the padding data position is corrected. Different padding modes are only different in the data that needs to be padded in the padded data position and the other steps are basically the same as the above, and will not be repeated here.

Step f2, padding the second data as a padding data to the padding data position.

In this step, after reading the corresponding second data according to the corrected storage address, the padding apparatus pads the second data as a padding data to the padding data position of the calculation window. For example: when the first padding mode is replication padding mode (replication), when the calculation window is located in the upper left corner of the target image as shown in FIG. 3, that is, the position of the black box, the padding apparatus will correct the first storage address corresponding to the corresponding padding data position of the coordinates (1,1), (2,1) and (1,2) to 2a+2, correct the first storage address corresponding to the corresponding padding data position of the coordinate (3,1) to 2a+3, and correct the first storage address corresponding to the corresponding padding data position of the coordinate (1,3) to 3a+2. After that, the corresponding second data 0 is obtained according to the corrected first storage address 2a+2, and the second data 0 is padded to the padding data positions corresponding to the coordinates (1,1), (2,1) and (1,2); the corresponding second data 1 is obtained according to the corrected first storage address 2a+3, and the second data 1 is padded to the padding data position corresponding to the coordinate (3,1); and the corresponding second data 8 is obtained according to the corrected first storage address 3a+2, and the second data 8 is padded to the padding data position corresponding to the coordinate (1,3). It should be noted that when the first padding mode is the reflection padding mode (reflection and reflection 101) or the wrap padding mode (wrap), the steps of padding the second data as a padding data to the padding data position are basically the same as the above-mentioned steps, which will not be repeated here.

Step g, if the preset padding mode is the second padding mode, then according to the storage address corresponding to the padding data position, reading the corresponding first data, and padding the first data to the padding data position.

In this step, if the padding apparatus determines that the preset padding mode is the second padding mode, that is, the constant padding mode (constant). Since in the constant padding mode (constant), the padding data position in the virtual target picture needs to be padded with the corresponding constant data, the padding apparatus determines the corresponding constant data according to the specific neural network algorithm, and pads the constant data to the padding data position.

When detecting a calculation command, the AI chip padding apparatus of this embodiment obtains the first coordinate set contained in the calculation window and the storage address set corresponding to the original picture, determines the boundary coordinate set of the original picture in the second coordinate set corresponding to the storage address set, and performs the boundary detection based on the first coordinate set and the coordinate set by the comparison unit. If there is a first coordinate outside the boundary coordinate set in the first coordinate set, it is determined that the calculation window contains the padding data position. If the AI chip padding apparatus determines that the calculation window contains the padding data position, it obtains and identifies the preset padding mode. If the preset padding mode is the first padding mode, the address correction unit and the address transformation unit are used to correct the first storage address corresponding to the first coordinate of the padding data position, and the corresponding second data is read from the memory according to the corrected first storage address, and the second data, as the padding data, is padded to the padding data position by the selection output unit; if the preset padding mode is the second padding mode, the corresponding first data is read, and the first data is padded to the padding data position by the selection output unit, which improves the efficiency of the padding operation to improve the performance of AI chips, thereby improving the computational efficiency of neural network algorithms.

Further, based on the first embodiment of the padding method of the present disclosure, a second embodiment of the padding method of the present disclosure is proposed.

The difference between the second embodiment of the padding method and the first embodiment of the padding method lies in that after step S20, it further includes:

Step h, inputting a data set contained in the calculation window that has undergone the padding operation into a calculation module to obtain a target calculation result, and performing the steps of obtaining the first coordinate set contained in the calculation window and the storage address set corresponding the original picture, and according to the first coordinate set and the storage address set, determining whether the calculation window contains the padding data position.

In this embodiment, the padding apparatus inputs the padding data and/or non-padding data contained in the calculation window that has undergone the padding operation into the calculation module, calculates the target calculation result through the calculation module, and controls the calculation window to start from the position of the black box shown in FIG. 3, and then controls the calculation window to move towards the row direction of the virtual target picture, that is, the width direction. In each movement, the coordinate set contained in the calculation window is obtained once, and according to the coordinate set and storage address set, it is determined that whether the calculation window contains the padding data position and subsequent steps. When the calculation window moves to the far right of the target picture, that is, the calculation window contains: the first row "P, P, P", the second row "6, 7, P", the third row "14, 15, P", the coordinate set contained in the calculation window is obtained. According to the first coordinate set and the storage address set corresponding to the original picture, whether the calculation window contains the padding data position is determined according to the first coordinate set and the storage address set and after the calculation is completed in the subsequent steps, the calculation window is controlled to return to the position of the black box shown in FIG. 3, and then the calculation window is controlled to move down according to the corresponding column step size of the calculation window, which causes the calculation window to include: the first row "P, 0, 1", the second row "P, 8, 9", the third row "P, 16, 17", and so on. The calculation window is controlled to move until the entire virtual target picture is calculated, and the target picture is obtained according to all the target calculation results.

The padding apparatus of this embodiment inputs the data set contained in the calculation window that has undergone the padding operation into the calculation module to obtain the target calculation result, and executes the steps of obtaining the first coordinate set contained in the calculation window and the storage set corresponding to the original picture address, and according to the first coordinate set and the storage address set, determining whether the calculation window contains the padding data position. It is helpful to improve the efficiency of the padding operation to improve the performance of the AI chip, thereby improving the computational efficiency of the neural network algorithm.

The disclosure also provides a padding apparatus. The padding apparatus of the present disclosure includes:

an obtaining module, configured to when a calculation command is detected, obtain a first coordinate set contained in a calculation window and a storage address set corresponding to an original picture, and according to the first coordinate set and the storage address set, determine whether the calculation window contains a padding data position;

a padding module, configured to if the calculation window contains the padding data position, perform a padding operation on the padding data position according to a preset padding mode.

Furthermore, the obtaining module further include a storing module, the storing module configured to obtain the original picture, generate a second coordinate set corresponding to a valid data position in the original picture according to the number of rows and columns of the original picture, so as to obtain the storage address set corresponding to the original picture, and according to the storage address set, store a valid data in the original picture into a memory.

Furthermore, the obtaining module is further configured to determine a boundary coordinate set of the original picture in the second coordinate set corresponding to the storage address set, and perform a boundary detection based on the first coordinate set and the boundary coordinate set;

if there is a first coordinate outside the boundary coordinate set in the first coordinate set, determine that the calculation window contains the padding data position.

Furthermore, the padding module is further configured to if the calculation window contains the padding data position, obtain and identify the preset padding mode;

if the preset padding mode is a first padding mode, determine a padding rule according to the first padding mode, and perform the padding operation on the padding data position according to the padding rule;

if the preset padding mode is a second padding mode, read a corresponding first data, and pad the first data to the padding data position.

Furthermore, the padding module is further configured to if the preset padding mode is the first padding mode, correct a first storage address corresponding to the first coordinate of the padding data position, and read a corresponding second data according to a corrected storage address;

pad the second data as a padding data to the padding data position.

Furthermore, the padding module further includes a correction module, the correction module configured to according to the first padding mode and the storage address set corresponding to the original picture, determine a second storage address corresponding to a data to be padded in the padding data position, and correct the first storage address corresponding to the first coordinate of the padding data position to the second storage address.

Furthermore, the padding module further include an outputting module, the outputting module configured to inputs a data set contained in the calculation window that has undergone the padding operation into a calculation module to obtain a target calculation result, and performs the steps of obtaining the first coordinate set contained in the calculation window and the storage address set corresponding the original picture, and according to the first coordinate set and the storage address set, determining whether the calculation window contains the padding data position.

The present disclosure also provides a padding system.

The padding system including: a processor, a memory, an AI chip, and a padding driver program stored in the memory and runnable on the processor to drive the AI chip to execute. When driving the AI chip to execute, the padding driver program implements the steps of the padding method described above.

The method implemented when the padding driver drives the AI chip to execute may refer to the various embodiments of the padding method of the present disclosure, which will not be repeated here.

The present disclosure also provides a computer readable storage medium.

The computer readable storage medium of the present application stores a padding driver program thereon, and when driving the AI chip to execute, the padding driver program implements the steps of the padding method described above.

The method implemented when the padding driver drives the AI chip to execute may refer to the various embodiments of the padding method of the present disclosure, which will not be repeated here.

It should be noted in the present disclosure that, the terms "comprising", "containing" or any other variations thereof are intended to encompass non-exclusive inclusion, such that a process, method, article or system including a series of elements not only includes those elements, but also includes other elements not expressly listed or inherent to such a process, method, article or system. Without further limitation, an element limited by the phrase "comprising a . . . " does not exclude the presence of additional identical elements in the process, method, article or system that includes the element.

The above-mentioned serial numbers of the embodiments of the present disclosure are only for description, and do not represent the advantages or disadvantages of the embodiments.

From the description of the above embodiments, those skilled in the art can clearly understand that the method of the above embodiment can be implemented by means of software plus a necessary general hardware platform, and of course can also be implemented by hardware, but in many cases the former is better implementation. Based on such understanding, the technical solutions of the present disclosure in essence or the parts that make contributions to the prior art can be embodied in the form of software products, and the computer software products are stored in one of the storage mediums (such as ROM/RAM, magnetic disk, optical disk) as described above, including several instructions to cause a terminal system (which may be a mobile phone, a computer, a server, or a network system, etc.) to execute the methods described in the various embodiments of the present disclosure.

The above are only the preferred embodiments of the present disclosure, and are not intended to limit the scope of the present disclosure. Any equivalent structure or equivalent process transformation made by using the contents of the specification and drawings of the present disclosure, or direct or indirect application in other related technical fields, are similarly included in the scope of patent protection of the present disclosure.

What is claimed is:

1. A padding apparatus, comprising:

a processor configured to (a) when a calculation command is detected, obtain a first coordinate set contained in a calculation window and a storage address set corresponding to an original picture, and according to the first coordinate set and the storage address set, determine whether the calculation window contains a padding data position; and (b) if the calculation window contains the padding data position, perform a padding operation on the padding data position according to a preset padding mode, wherein the processor is further configured to:

(b1) if the calculation window contains the padding data position, obtain and identify the preset padding mode; and (b2) if the preset padding mode is a first padding mode, determine a padding rule according to the first padding mode, and perform the padding operation on the padding data position according to the padding rule;

wherein the processor is further configured to:

(b21) if the preset padding mode is the first padding mode, correct a first storage address corresponding to a first coordinate of the padding data position, and read a corresponding second data according to a corrected storage address; and (b22) pad the second data as a padding data to the padding data position.

2. An AI chip padding system, comprising:

a memory, a processor, an AI chip, and a padding driver program stored in the memory and runnable on the processor to drive the AI chip to execute, the padding driver program implementing a padding method comprising the steps of:

(a) when a calculation command is detected, obtaining a first coordinate set contained in a calculation window and a storage address set corresponding to an original picture, and according to the first coordinate set and the storage address set, determining whether the calculation window contains a padding data position; and (b) if the calculation window contains the padding data position, performing a padding operation on the padding data position according to a preset padding mode, wherein step (b) comprises:

(b1) if the calculation window contains the padding data position, obtaining and identifying the preset padding mode; and (b2) if the preset padding mode is a first padding mode, determining a padding rule according to the first padding mode, and performing the padding operation on the padding data position according to the padding rule;

wherein step (b2) comprises:

(b21) if the preset padding mode is the first padding mode, correcting a first storage address corresponding to a first coordinate of the padding data position, and reading a corresponding second data according to a corrected storage address; and (b22) padding the second data as a padding data to the padding data position.

3. The padding system of claim 2, wherein before step (a), the padding method comprises:

obtaining the original picture, according to the number of rows and columns of the original picture, generating a second coordinate set corresponding to a valid data position in the original picture, so as to obtain the storage address set corresponding to the original picture, and according to the storage address set, storing a valid data in the original picture into a memory.

4. The padding system of claim 3, wherein step (a) comprises:

(a1) determining a boundary coordinate set of the original picture in the second coordinate set corresponding to the storage address set, and performing a boundary detection based on the first coordinate set and the boundary coordinate set; and (a2) if there is a first coordinate outside the boundary coordinate set in the first coordinate set, determining that the calculation window contains the padding data position.

5. The padding system of claim 2, wherein step (b) comprises:

(b3) if the preset padding mode is a second padding mode, reading a corresponding first data, and padding the first data to the padding data position.

6. The padding system of claim 2, wherein step (b21) comprises:

(b211) according to the first padding mode and the storage address set corresponding to the original picture, determining a second storage address corresponding to a data to be padded in the padding data position, and correcting the first storage address corresponding to the first coordinate of the padding data position to the second storage address.

7. The padding system of claim 2, wherein after step (b), the padding method further comprises:

(c) inputting a data set contained in the calculation window that has undergone the padding operation into a calculation module to obtain a target calculation result, and performing the steps of obtaining the first coordinate set contained in the calculation window and the storage address set corresponding the original picture, and according to the first coordinate set and the storage address set, determining whether the calculation window contains the padding data position.

8. A non-transitory computer readable storage medium storing a padding driver program thereon, wherein the padding driver program comprises instructions that, when executed by a processor, cause the processor to drive an AI chip to perform following steps:

(a) when a calculation command is detected, obtaining a first coordinate set contained in a calculation window and a storage address set corresponding to an original picture, and according to the first coordinate set and the storage address set, determining whether the calculation window contains a padding data position; and (b) if the calculation window contains the padding data position, performing a padding operation on the padding data position according to a preset padding mode;

wherein step (b) comprises:

(b1) if the calculation window contains the padding data position, obtaining and identifying the preset padding mode; and (b2) if the preset padding mode is a first padding mode, determining a padding rule according to the first padding mode, and performing the padding operation on the padding data position according to the padding rule;

wherein step (b2) comprises:

(b21) if the preset padding mode is the first padding mode, correcting a first storage address corresponding to a first coordinate of the padding data position, and reading a corresponding second data according to a corrected storage address; and (b22) padding the second data as a padding data to the padding data position.

9. The non-transitory computer readable storage medium of claim 8, wherein before step (a), the padding method comprises:

obtaining the original picture, according to the number of rows and columns of the original picture, generating a second coordinate set corresponding to a valid data position in the original picture, so as to obtain the storage address set corresponding to the original picture, and according to the storage address set, storing a valid data in the original picture into a memory.

10. The non-transitory computer readable storage medium of claim 9, wherein step (a) comprises:

(a1) determining a boundary coordinate set of the original picture in the second coordinate set corresponding to the storage address set, and performing a boundary detection based on the first coordinate set and the boundary coordinate set; and (a2) if there is a first coordinate outside the boundary coordinate set in the first coordinate set, determining that the calculation window contains the padding data position.

11. The non-transitory computer readable storage medium of claim 8, wherein step (b) comprises:

(b3) if the preset padding mode is a second padding mode, reading a corresponding first data, and padding the first data to the padding data position.

12. The non-transitory computer readable storage medium of claim 8, wherein step (b21) comprises:

(b211) according to the first padding mode and the storage address set corresponding to the original picture, determining a second storage address corresponding to a data to be padded in the padding data position, and correcting the first storage address corresponding to the first coordinate of the padding data position to the second storage address.

13. The non-transitory computer readable storage medium of claim 8, wherein after step (b), the padding method further comprises:

(c) inputting a data set contained in the calculation window that has undergone the padding operation into a calculation module to obtain a target calculation result, and performing the steps of obtaining the first coordinate set contained in the calculation window and the storage address set corresponding the original picture, and according to the first coordinate set and the storage address set, determining whether the calculation window contains the padding data position.

* * * * *